United States Patent
Sirpal

(10) Patent No.: US 10,416,953 B2
(45) Date of Patent: Sep. 17, 2019

(54) SYSTEM AND METHODS FOR A DISPLAY DEVICE ECOSYSTEM AND MODULAR PLATFORM

(71) Applicant: Jamdeo Canada Ltd., Oakville (CA)

(72) Inventor: Sanjiv Sirpal, Oakville (CA)

(73) Assignee: Qingdao Hisense Electronics Co., Ltd., Qingdao (CN)

(*) Notice: Subject to any disclaimer, the term of this patent is extended or adjusted under 35 U.S.C. 154(b) by 0 days.

(21) Appl. No.: 15/724,962

(22) Filed: Oct. 4, 2017

(65) Prior Publication Data

US 2018/0307452 A1 Oct. 25, 2018

Related U.S. Application Data

(60) Provisional application No. 62/487,716, filed on Apr. 20, 2017.

(51) Int. Cl.
*G06F 3/147* (2006.01)
*G06F 3/14* (2006.01)

(52) U.S. Cl.
CPC ............ *G06F 3/147* (2013.01); *G06F 3/1423* (2013.01)

(58) Field of Classification Search
CPC ............................... G06F 3/147; G06F 3/1423
See application file for complete search history.

(56) References Cited

U.S. PATENT DOCUMENTS

| 2016/0085329 A1* | 3/2016 | Yim | G06F 21/35 345/173 |
| 2017/0060518 A1* | 3/2017 | Hong | G06F 3/1454 |

* cited by examiner

*Primary Examiner* — Andrew Sasinowski
(74) *Attorney, Agent, or Firm* — Gordon & Rees LLP

(57) ABSTRACT

The present disclosure relates to systems, methods, and devices for display device operation in a connected ecosystem. In one embodiment, a method includes detecting a module placed on a module interface of the display device and initiating a pairing operation with the module. Operation of the module may be activated to provide functional output to the display device. Connectivity of the module with a second module associated with the module interface may be enabled by a display device such that the module and second module provides interoperability of at least one function of the module and the second module for use with the display device. In addition to supporting one or more modules by a display device, modules may be moved and connected to one or more other display devices in the ecosystem. In certain embodiments an interface is provided for coupling multiple physical units to a display device.

20 Claims, 5 Drawing Sheets

SYSTEM AND METHODS FOR A DISPLAY DEVICE ECOSYSTEM AND MODULAR PLATFORM

CROSS-REFERENCE TO RELATED APPLICATIONS

This application claims priority to U.S. Provisional Application No. 62/487,716 titled SYSTEM AND METHODS FOR DISPLAY DEVICE OPERATION AND EXPERIENCE filed on Apr. 20, 2017, the content of which is expressly incorporated by reference in its entirety.

FIELD

The present disclosure relates to electronic devices and system configurations, and more particularly to system, methods and devices configured for display device operation in a connected ecosystem.

BACKGROUND

Display devices, such as televisions have traditionally been used for providing broadcast content. With advances in device connectivity, smart televisions can provide functionality in addition to merely displaying content. Many smart televisions allow for communication with mobile devices, such as tablets or mobile phones. One typical use is to allow for mirroring of content. Even with the advances provided by smart televisions, many of televisions still connect to peripheral devices by way of cables to the back of the television. Connecting via a wireless link is usually limited to one device.

There is a desire to enhance the experience and operation of display devices. There is also a desire to allow for different types of devices to be used with a display device. Existing frameworks for televisions limit the use and functionality of display devices. As such, many existing peripheral devices can only connect to one display device. There exists a need to overcome existing configurations and to provide additional functionality to devices.

BRIEF SUMMARY OF THE EMBODIMENTS

Disclosed and claimed herein are systems, methods and devices for display device operation in a connected ecosystem. One embodiment is directed to a method including detecting, by a display device, a module placed on a module interface of the display device, and initiating, by the display device, a pairing operation with the module, wherein the pairing operation is performed by wireless communication between the module interface and the module. The method also includes activating, by the display device, operation of the module, wherein the module is activated to provide functional output to the display device. The method also includes enabling, by the display device, connectivity of the module with a second module associated with the module interface, wherein enabling connectivity of the module and second module provides interoperability of at least one function of the module and the second module for use with the display device.

In one embodiment, the module is at least one of a display module, camera module, media storage module, graphical element module and speaker module.

In one embodiment, the pairing operation associates the module with the location of the display device relative to at least one additional device of a multi-screen ecosystem.

In one embodiment, activating operation of the module includes displaying at least one module output on the display device associated with a functional use of the module, the functional use is at least one of providing media, imaging, providing a display, outputting an application interface, and sound output.

In one embodiment, activating operation of the module includes detection of a prior association with a second display device of the connected ecosystem and updating location of the module to the display device.

In one embodiment, enabling connectivity of the module with a second module includes exchange of output between the module and second module to generate a combined functional capability for the display device.

In one embodiment, the display device is configured to provide a graphical interface element to indicate device activation and module connection.

In one embodiment, the method further includes applying a power supply to the module by way of the interface.

Another embodiment is directed to a method for display device operation in a connected ecosystem including detecting, by a display device, a module placed on a module interface of the display device, and initiating, by the display device, a pairing operation with the module, wherein the pairing operation is performed by wireless communication between the module interface and the module. The method also includes detecting, by the display device, a prior association of the module with a second display device of the connected ecosystem. The method also includes activating, by the display device, operation of the module, wherein the module is activated to provide functional output to the display device, and updating, by the display device, a location of the module to the display device.

In one embodiment, the module is at least one of a display module, camera module, media storage module, graphical element module and speaker module.

In one embodiment, the pairing operation associates the module with the location of the display device relative at least one additional device of a multi-screen ecosystem.

In one embodiment, activating operation of the module includes displaying at least one module output on the display device associated with a functional use of the module, the functional use is at least one of providing media, imaging, providing a display, outputting an application interface, and sound output.

In one embodiment, the method further includes enabling connectivity of the module with a second module associated with the module interface, wherein enabling connectivity of the module and second module provides interoperability of at least one function of the module and the second module for use with the display device.

In one embodiment, the method further includes enabling connectivity of the module with a second module to provide exchange of output between the module and second module to generate a combined functional capability for the display device.

In one embodiment, the display device is configured to provide a graphical interface element to indicate device activation and module connection.

In one embodiment, the method further includes applying a power supply to the module by way of the interface.

Another embodiment is directed to a system including at least one module, and a first display device including a first interface. A control unit of the first display device is configured to detect at least one module placed on the first interface, and initiate a pairing operation with the module, wherein the pairing operation is performed by wireless communication between the first interface and the module. The control unit is also configured to activate operation of the module, wherein the module is activated to provide functional output to the first display device. The control unit is also configured to enable connectivity of the module with a second module associated with the first interface, wherein enabling connectivity of the module and second module provides interoperability of at least one function of the module and the second module for use with the first display device.

In one embodiment, the module is at least one of a display module, camera module, media storage module, graphical element module and speaker module.

In one embodiment, the system further includes a second display device, wherein activating operation of the module includes detection of a prior association with a second display device of the connected ecosystem and updating location of the module to the display device.

In one embodiment, the system further includes applying a power supply to the module by way of the interface.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
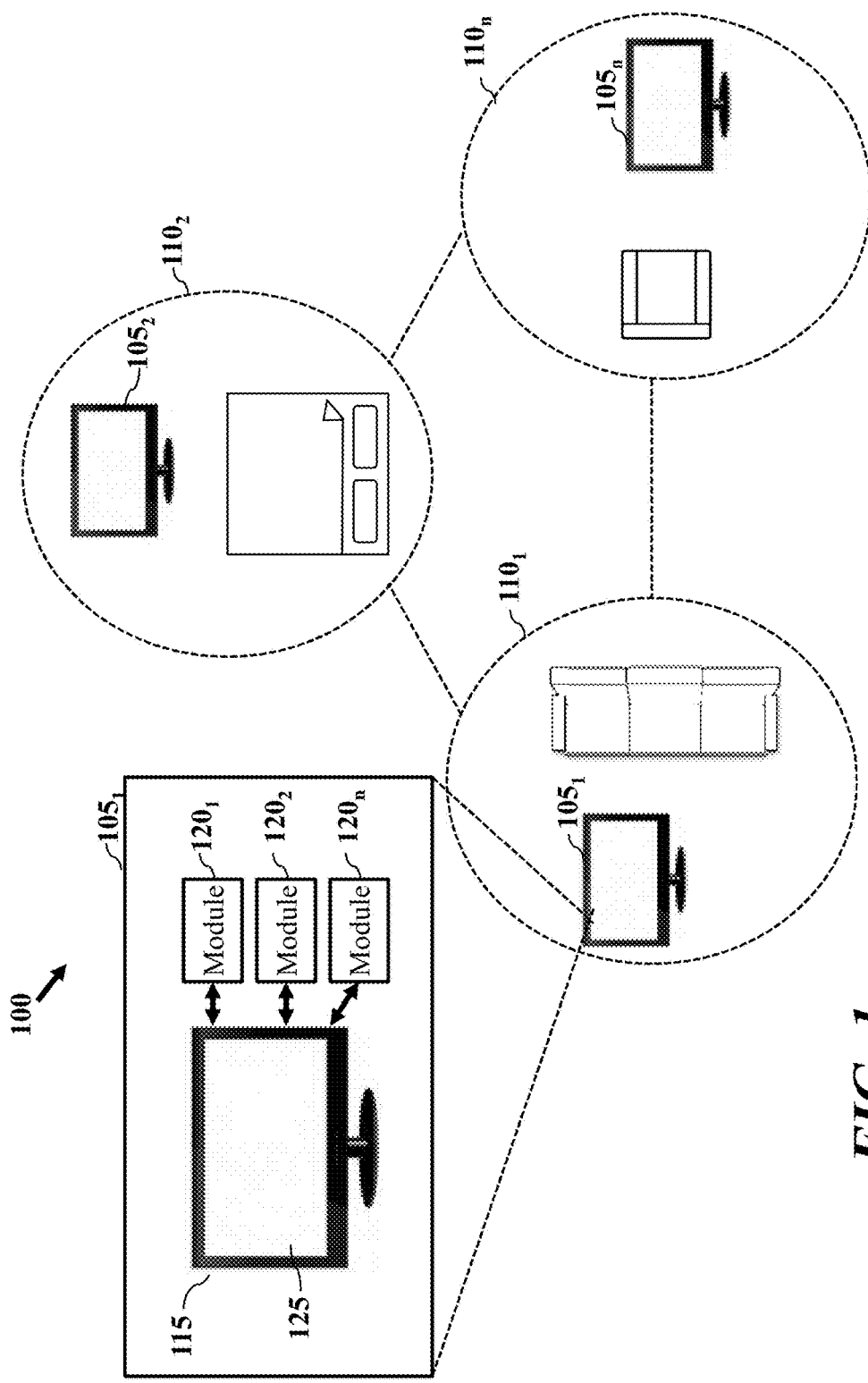
FIG. 1 depicts a system diagram according to one or more embodiments.

One aspect of the disclosure is directed to providing an integrated platform for display devices, such as digital televisions. The platform can include one or more display devices and one or more modules. The platform can also include a plurality of module types, such that each module is purpose built to enhance operation of the display device and the user experience. Systems, methods and devices described herein are provided for use of one or more display devices within one or more modules.

In one embodiment, a system is provided to allow for display devices to interoperate with one or more modules. Processes are provided for pairing modules to one or more display devices. The system may be applied to a multi-screen ecosystem.

Another embodiment is provided for connection of a module to one or more display devices. By way of example, one or more devices may connect to an interface of the display device, such as a connected shelf to allow for pairing with the display device and use of module functions by the display device.

Another embodiment is directed to device configurations and interfaces to allow for modules. Module configurations are discussed herein relating to physical units that may be configured with one or more attributes (e.g., imaging, sound output, media storage, etc.) and one or more operational configurations for use with one or more display devices of a multi-display ecosystem. According to one embodiment processes are described for pairing one or more modules to a display device. According to another embodiment, processes and device configurations are provided for switching a module from a first display device to a second display device. In addition to pairing and swapping location, modules connected to the same interface may be employed collectively by a display device to extend capabilities.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a system diagram according to one or more embodiments. According to one embodiment, system 100 relates to a connected ecosystem including a plurality of display devices $105_{1-n}$, each device associated with a location, such as locations $110_{1-n}$. According to one embodiment, device configurations and processes are provided for display device operation within system 100. According to another embodiment, system 100 may support one or more modules. Device configurations and processes are providing for connectivity of modules to one or more devices, and association of the modules to one or more of devices $105_{1-n}$ and locations $110_{1-n}$.

In an exemplary embodiment, system 100 includes at least one module and at least one display device, such as a first display device including a first interface. System 100 may be configured to support multiple display devices. The control unit of each display device is configured to detect at least one module placed on an interface associated with the display device. The display device can then perform one or more functions to enable the module, such as initiating a pairing operation with the module, activating operation of the module, and enabling connectivity of the module with a second module associated with the first interface. Pairing of the module to a display device and interface may be performed by wireless communication between the module and interface. Each module is activated to provide a functional output, which can include display content for the display device. Once enabled, the module and a second module, or one or more other modules, may be interoperable such that at least one function of the module and the second module may be for use with the display device.

According to another embodiment, processes and configuration are provided for a device, such as display device $105_1$, to interoperate with one or more modules, such as modules $120_{1-n}$. Each of display devices $105_{1-n}$ of system 100 may be configured to detect a module, pair with one or more modules. As will be discussed in more detail below, display devices $105_{1-n}$ may be configured to detect and communicate with modules $120_{1-n}$ by way of an interface. The interface may be part of a display device or a separate physical element. The interface may allow for communication with modules $120_{1-n}$. According to another embodiment, the interface extends the functionality of display device $105_1$ by allowing for one or more functions to be added to operation of the display device.

As used herein, a module may provide a functional use. In addition, modules $120_{1-n}$ may relate to one or more types of modules, such as display module, camera module, media storage module, graphical element module and speaker module. In one embodiment, each of modules $120_{1-n}$ are stand alone devices.

According to one embodiment, different modules $120_{1-n}$ can be used with different display devices $105_{1-n}$. According to another embodiment, modules $120_{1-n}$ may be passed or moved to different display devices $105_{1-n}$. By swapping modules, or moving a module to a different display device, enhanced usage scenarios may be provided. Modules $120_{1-n}$ can extend functionality of a display device by providing a functionality or display that is not provided by the display device. By way of example, when the display device is presenting content, a module may be a display associated with an application (e.g., weather application, news, clock, etc.) such that the display of the module can present a user interface for the application without requiring the display device to present the user interface of the application. In addition, each module may interoperate with other modules such that functions elements of each module may be combined and used with the display device. For a system including a media player module and a speaker module, the media player may output content for display on the display device and output sound to be output by the speaker module. When a module is swapped or activated on a second display device or interface, an activating operation of the module includes detection of prior associations with other display devices of the connected ecosystem. The location of the module may be updated after each pairing to provide a basis for modules to interoperate with similarly located modules.

In FIG. 1, system 100 includes display devices $105_{1-n}$ however, it should be appreciated that the functionality of the display devices and system 100 may be applied to other types of devices. For residential use, locations $110_{1-n}$ may relate to different rooms or locations in the residence. For commercial or office use, locations $110_{1-n}$ may relate to different rooms or locations within a structure.

System 100 may relate to a multi-screen ecosystem according to one or more other embodiments. The multi-screen ecosystem allows for an omni-display, such that multiple screens in a home can collaborate together to augment experiences independently across all screens. All screens can work together as part of a larger ecosystem. The multi-screen ecosystem will include simple setup, mirroring of content, picture in picture, an open spatial experience and peripheral connectivity. According to another embodiment, all displays will allow for connectivity to one or more modules.

A multi-screen ecosystem can allow for connected displays, such that the displays can each display content and/or share content with other devices. A mesh network may be provided to connect devices $105_{1-n}$ of system 100. The multi-screen ecosystem allows for continuity of presence across the different displays. Display content can be mirrored within a display window on another device and thus provide the ability to see what is output on the second device.

System 100 may also relate to a multi-screen ecosystem according to one or more other embodiments. The multi-screen ecosystem provides multiple screens in a home to collaborate together. Experiences may be augmented independently and/or across all screens, such as a bedroom, living room and den. A unified mesh network may be incorporated for the multi-screen ecosystem.

Figure 2:
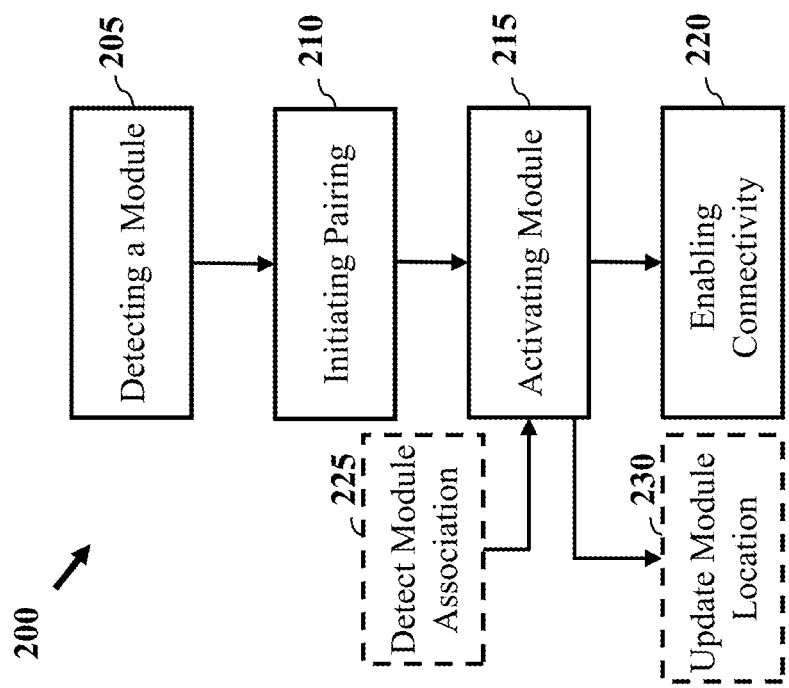
FIG. 2 depicts a process for display device operation in a connected ecosystem according to one or more embodiments.

FIG. 2 depicts a process for display device operation in a connected ecosystem according to one or more embodiments. Processing 200 may allow for a device to detect one or more modules and for modules to be enabled. Enabling modules may allow for functions of the modules to be combined. According to one embodiment, process 200 is executed by device (e.g., display device $105_1$ etc.). Process 200 includes detecting a module placed on a module interface of the display device at block 205. At block 205, for example, the interface may include one or more elements to signal placement of a module on the interface. When the interface relates to a physical structure such as a shelf that is either part of or separate from a display device, the interface may detect placement of modules on the shelf by one or more of near field communication, wireless communication, etc. Each module may provide a certain function and/or may be asserted with particular type of modules. Modules may relate to one or more of a display module, camera module, media storage module, graphical element module and speaker module.

According to one embodiment, detection of a module at block 205 is automatically performed by the device. In contrast to connecting a peripheral device to the back of a television, detecting a module may be performed by the module being placed on the interface or by way of a wireless communication with the interface and/or display device. The interface may provide one or more features, including the ability to charge devices on the shelf.

At block 210, process 200 includes initiating a pairing operation with the module. A pairing operation is performed to allow for exchange of data between a module and a display device. The pairing operation may be performed by wireless communication between the module interface and the module. In one embodiment, the pairing operation associates the module with the location of the display device relative at least one additional device of a multi-screen ecosystem. By associating a module with a location, other modules in the location can interoperate together.

At block 215, process 200 includes activation operation of the module. According to one embodiment, modules may not be activated until paired with a display device. The modules may be is activated to provide functional output to the display device. In certain embodiments, activating operation of the module includes displaying at least one module output on the display device associated with a functional use of the module. By way of example functional uses can include at least one of providing media, imaging, providing a display, outputting an application interface, and sound output.

At block 220, process 200 includes initiating enabling connectivity of the module with a second module associated with the module interface. Enabling connectivity of two or more modules allows for greater features to be provided. Enabling connectivity of the module with a second module can include exchange of output between the module and second module to generate a combined functional capability for the display device. In certain embodiments, the display device is configured to provide a graphical interface element to indicate device activation and module connection. Enabling connectivity can include applying a power supply to the module by way of the interface.

Process 200 may optionally include detecting module associations at block 225. According to one embodiment, detection of a previous module association can avoid having to setup a module once moved to a different location in the ecosystem. As such, activating operation of the module can include detection of a prior association with a second display device of the connected ecosystem and updating location of the module to the display device.

Process 200 may optionally include updating module location at block 230. According to one embodiment, a location of the module is updated at block 230 such that positioning of the module is associated with a particular interface. In one embodiment, module interoperation may be based on module location.

Figure 3:
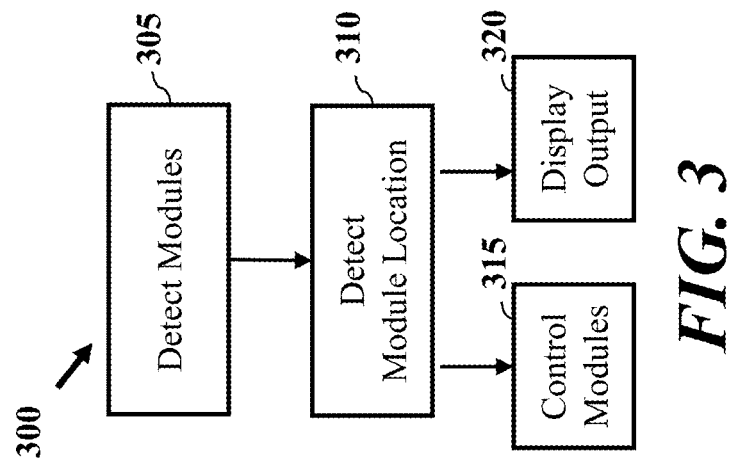
FIG. 3 depicts a process for display device operation according to another embodiment.

FIG. 3 depicts a process for display device operation in a connected ecosystem according to one or more embodiments. Processing 300 may allow for a device to detect one or more modules, and for control of module and display device operation. At block 305, a display device may be configured to detect modules based on placement with an interface. Once, detected, the location of the module may be determined at block 310. Module location may be determined relative to a connected ecosystem. At block 315, the modules may be controlled by a display device. By way of example, control at block 315 may relate to formatting or updating display characteristics and content of modules. Control at block 315 may also include applying a power supply to the module by way of the interface. According to another embodiment, a display device may display output based on data provided by a module.

Figure 4:
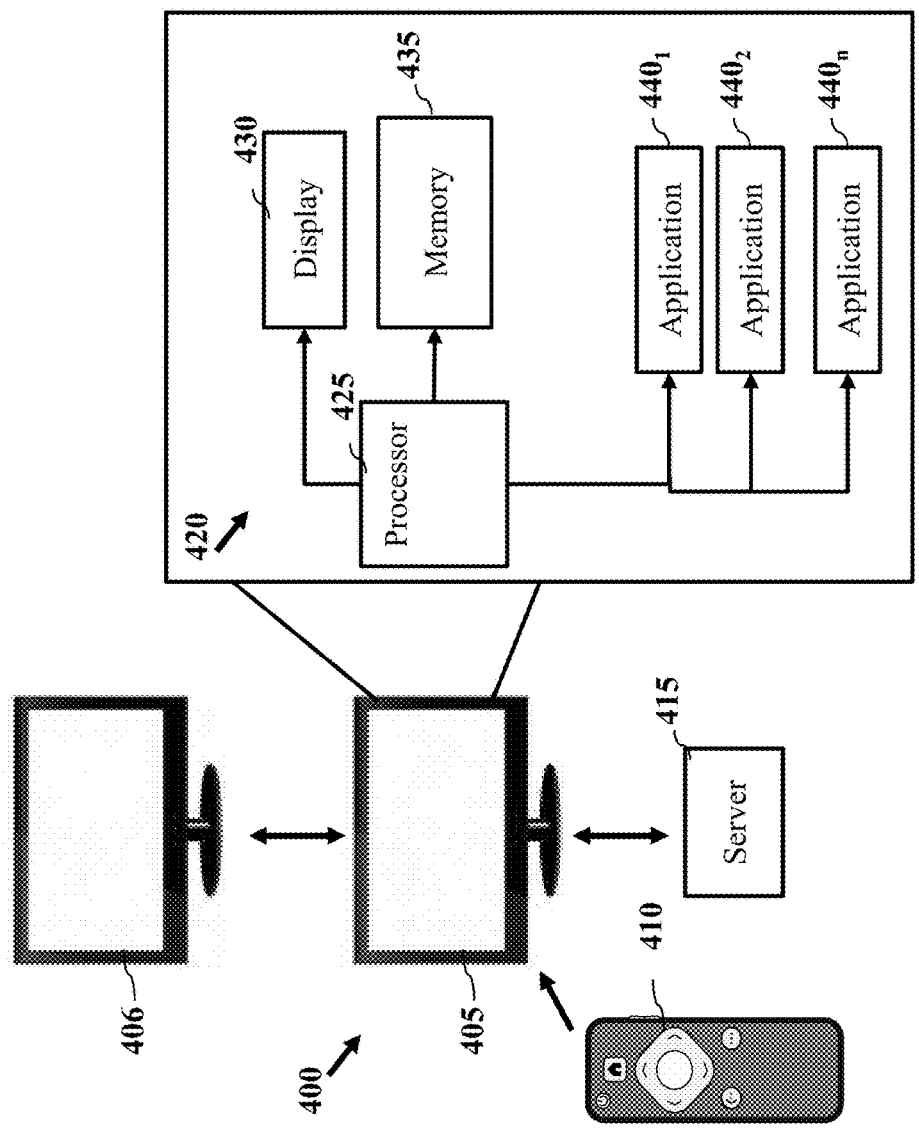
FIG. 4 depicts a diagram of a device configuration according to one or more embodiments.

FIG. 4 depicts a diagram of a device configuration according to one or more embodiments. System 400 and display device 405 are configured to perform one or more functions, which may include pairing with and control of one or more modules. System 400 and display device 405 may control operation of display device 405 and one or more other devices, such as display device 406. Display device 405 may receive commands and interoperate with remote control 410. Content, applications and other network services may be provided to display device 405 by way of one or more content servers, such as content server 415.

Display device 405 includes processor 425, display 430, memory 435, and applications $440_{1-n}$. It should be appreciated that digital television 405 may include one or more additional components not shown in FIG. 4. Display device 405 is configured to present a control interface as described herein.

Processor 425, in addition to controlling operation of a digital television, is configured to control presentation and operation of a control interface. According to one embodiment, processor 425 is configured to detect input associated with placement of a module on an interface.

Figure 5:
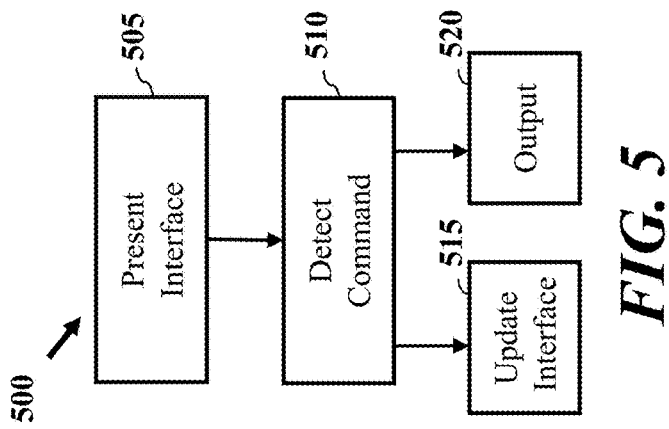
FIG. 5 depicts a process for according to one or more embodiments.

FIG. 5 depicts a process for device operation according to one or more other embodiments. Process 500 may be employed by a device (e.g., display device 405) to perform one or more functions and features described herein. According to one embodiment, process 500 is performed by a processor (e.g., processor 425) based on instructions stored in non-transitory memory 435.

Process 500 includes presentation of an interface at block 505. Display parameters of a display device can include one or more graphical elements when a device is paired or detected by a display device. At block 510, the display device detects a command. The display device can update the interface at block 515. At block 520, the display device may output one or more of data, commands, and information.

When a new device is added to an interface, an interface display on a display device in response to 515 can include one or more graphical elements representing modules connected to the display device. When a module is swapped to another device, the interface and any joint functions with other modules may be updated. For modules which provide output (e.g., video, music, audio, etc.), the output is provided at block 520.

Figure 6:
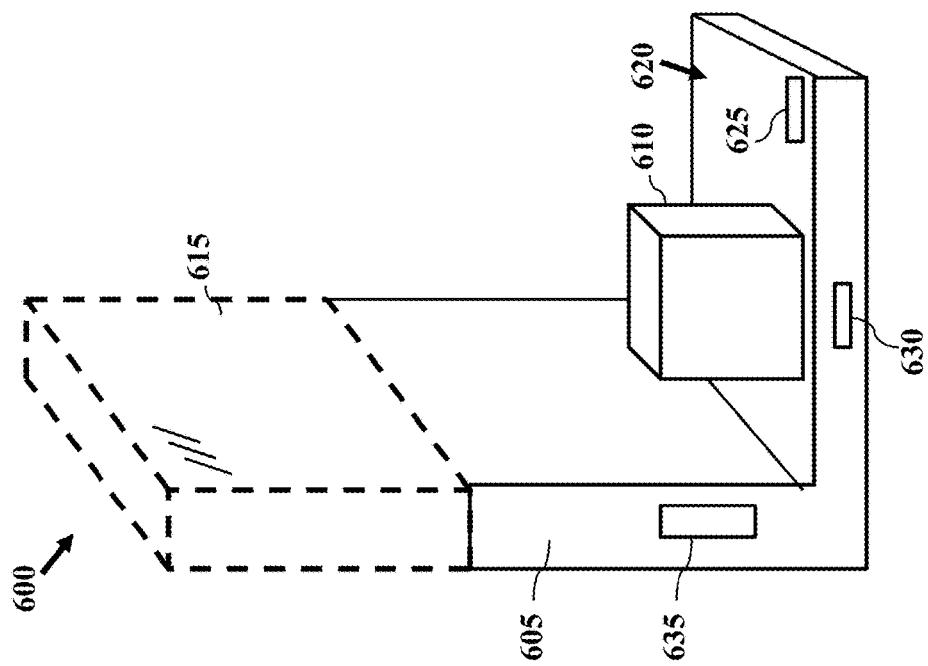
FIG. 6 depicts a representation of an interface according to one or more embodiments.

FIG. 6 depicts a representation of an interface according to one or more embodiments. According to one embodiment, an interface may be part of a display device or a separate element in close proximity of a display device. Interface 600 is shown relative to a module Interface 600 includes structure 605 configured to receive one or more modules, such as module 610. In certain embodiments, interface 600 and structure 605 are part of a display device including display portion 615. In other embodiment, display portion 615 is optional or not included and interface 600 may relate to a standalone unit configured to connect to a display device.

Module 610 may be placed on a surface 620, or shelf of interface 600. According to one embodiment, interface 600 includes a plurality of sensors distributed below surface 620, such as sensor 630. Sensor 630 may be employed to detect placement of the module. Indicator 625 may be an LED, lighted source or other indicated configured to provide an output (e.g., light) when module 610 is detected by sensor 630. According to one embodiment, interface 600 may be configured to power module 610.

Although FIG. 6 depicts one module, module 610, it should be appreciated that interface 600 may support a plurality of modules at the same time.

Figure 7:
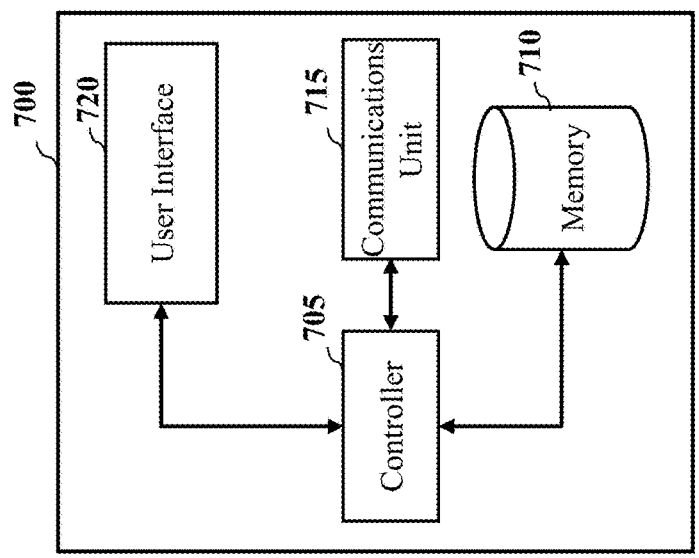
FIG. 7 depicts a module configuration according to one or more embodiments.

FIG. 7 depicts a module configuration according to one or more embodiments. As discussed herein, different modules may be provided, such as some with display screens and others performing other features such as sound output. FIG. 7 depicts a simplified diagram of one or more components that may be included in each module. Device 700 may relate to one or more types of modules, such as a media player, personal communication device, tablet, and electronic device having display. In certain embodiments, device 700 is a standalone device. In other embodiments, device 700 is a computing device (e.g., computer, media player, etc.) configured to interoperate with another device. Similarly, in some embodiments, device 700 includes a display for presentation of a user interface for an application, while for other types of modules device 700 does not include a display.

As shown in FIG. 7, device 700 includes controller 705, memory 710, communications unit 715 and user interface 720. Controller 705 may be configured to execute code stored in memory 710 for operation of device 700 including for connection to an interface or display device. In an exemplary embodiment, controller 705 is configured to control a display of a module including presentation of an interface associated with one or more computer applications (e.g., news, clock, social media, and applications in general). According to one embodiment, controller 705 may be configured to communicate with one or more other modules using communications unit 715.

According to another embodiment, controller 705 includes a processor and/or one or more processing elements. In one embodiment, controller 705 includes one or more of hardware, software, firmware and/or processing components in general. According to one embodiment, controller 705 is configured to perform one or more processes described herein. Communications unit 715 is configured for wired and/or wireless communication with one or more network elements, such as servers. Memory 710 can include non-transitory RAM and/or ROM memory for storing executable instructions, operating instructions and content for display. User interface 720 can include one or more input/output interfaces for control and/or communication, including a display, speaker output, etc.

Figure 8:
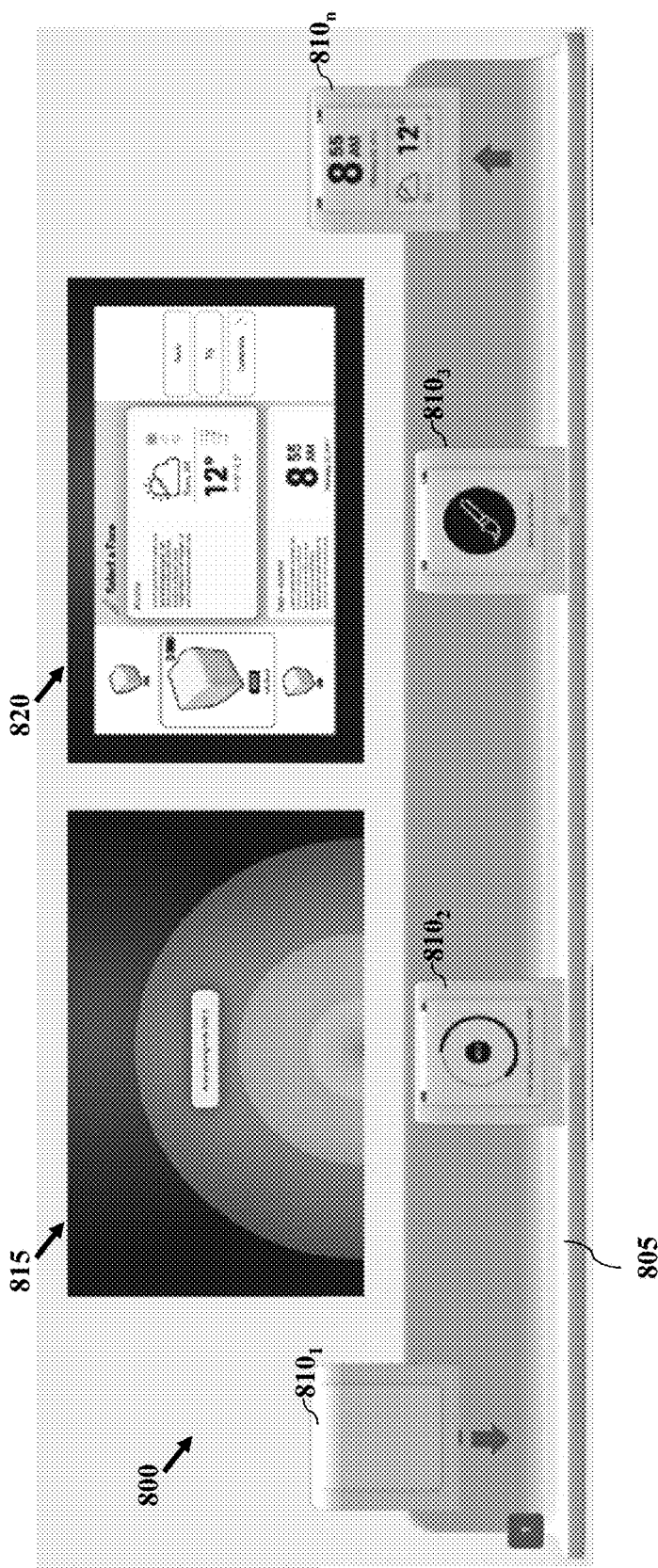
FIG. 8 depicts a graphical representation of an interface configuration according to one or more embodiments.

FIG. 8 depicts a graphical representation of an interface configuration according to one or more embodiments. According to one embodiment, interface 800 includes a connected shelf 805, which can receive one or more modules 810$_{1-n}$.

In one embodiment, interface 800 includes a connected shelf 805 that is either part of a display device or connected to a display device. Connected shelf 805 may be used to pair (using near field communications (NFC) or other), charge (inductive), and communicate (Bluetooth or WiFi) relative to a display device and one or more modules. Connected shelf 805 can be integrated into a display/appliance (shelf) or standalone (tray). Unpaired modules may be placed on the connect shelf/tray. After placing the module, the display device will automatically initiate a pairing process. In certain embodiments, pairing requires zero user setup. Depending on the module, a user can select a module face (e.g., display output) and further configure module functionality. The module or cube may now be ready to be placed anywhere. It will only need to be placed back on the shelf in order to charge.

Modules 810$_{1-n}$ may be physical companion objects that work with a display device to enhance control and/or augment functionality of the display device. For example, a module may include one or more functions to provide a clock, camera, speakers, lighting module, etc. Each module may pair with the display device in a seamless, zero-setup experience. FIG. 8 depicts modules 810$_{1-n}$ including displays.

According to one embodiment one or more of modules 810$_{1-n}$ may be paired to connected shelf 805. By way of example, FIG. 8 depicts placing module 810$_1$ on connected shelf 805. The module can be placed anywhere on the shelf. If the module is not charged, it will automatically start charging via an inductive charging system. The module initially communicates to the connected shelf 805 via near field communication (NFC). Secondary communication is provided by either Bluetooth or WiFi.

According to another embodiment, interface 800 is configured for autopairing of a module to the shelf. In one embodiment, auto-pairing starts the moment a handshake is established through near field communication between the module and connected shelf 805. If the device is already placed on the connected shelf 805 (e.g., device 810$_2$), it will begin charging. If the device is paired with another shelf, it will then trigger a follow-me function as required by the device. The shelf will automatically determine the location of the module. In the case of a standalone shelf, or a standalone cube is being configured, a mobile application will be required. The module may provide onscreen feedback such as automatically start TV, indicate that pairing is required on the module, and/or indicate that a pairing process is initiated via an onscreen user interface.

FIG. 8 depicts the ability of modules, such as module 810$_n$, to be picked and placed anywhere. In one embodiment, a module is configured and can remain on connected shelf 805 or be removed. Removal of the module still retains connection to the tray.

According to one embodiment, connection of a module to connected shelf 805 can result in one or more graphical elements to be output on the display device. In one embodiment, a module generates a graphical representation of a bubble, shown as 815, on the display device. When a second display device (TV 2) is on with another module attached to it. Module is placed on a tray of the second display device; it is paired and continues to make bubbles on TV2.

Based on connection of a module to connected shelf 805, one or more faces (e.g., display configurations) can be applied to a module. Module configuration can be provided by a connected shelf 805 and/or a display device. In one embodiment, great effort should be taken to auto-configure a module to minimize friction. Modules should auto-download the appropriate application or services that are required. A user may select a module face, depending on the module. In one embodiment, using a display device, the user selects the module, selects a face for the module from a face gallery, applies the face (in some cases, application of the face may be permanent). In certain embodiments, a face may be temporarily applied to preview the configuration. Selected faces may be customized further.

While this disclosure has been particularly shown and described with references to exemplary embodiments thereof, it will be understood by those skilled in the art that various changes in form and details may be made therein without departing from the scope of the claimed embodiments.

What is claimed is:

1. A method for display device operation in a connected ecosystem, the method comprising:
    detecting, by a display device, a module placed on a module interface of the display device, the module interface including a connected shelf integrated with the display device, the connected shelf configured to receive the module;
    initiating, by the display device, a pairing operation with the module, wherein the pairing operation is performed by wireless communication between the module interface and the module;
    activating, by the display device, operation of the module, wherein the module is activated to provide functional output to the display device; and
    enabling, by the display device, connectivity of the module with a second module associated with the module interface, wherein enabling connectivity of the module and second module provides interoperability of at least one function of the module and the second module for use with the display device, wherein each module is a physical companion object that is configured to work with the display device for at least one of enhancing control and augmenting functionality of the display device.

2. The method of claim 1, wherein the module is at least one of a display module, camera module, media storage module, graphical element module and speaker module.

3. The method of claim 1, wherein the pairing operation associates the module with the location of the display device relative to at least one additional device of a multi-screen ecosystem.

4. The method of claim 1, wherein activating operation of the module includes displaying at least one module output on the display device associated with a functional use of the module, the functional use is at least one of providing media, imaging, providing a display, outputting an application interface, and sound output.

5. The method of claim 1, wherein activating operation of the module includes detection of a prior association with a second display device of the connected ecosystem and updating location of the module to the display device.

6. The method of claim 1, wherein enabling connectivity of the module with a second module includes exchange of output between the module and second module to generate a combined functional capability for the display device.

7. The method of claim 1, wherein the display device is configured to provide a graphical interface element to indicate device activation and module connection.

8. The method of claim 1, further comprising applying a power supply to the module by way of the interface.

9. A method for display device operation in a connected ecosystem, the method comprising:
- detecting, by a display device, a module placed on a module interface of the display device, the module interface including a connected shelf integrated with the display device, the connected shelf configured to receive the module;
- initiating, by the display device, a pairing operation with the module, wherein the pairing operation is performed by wireless communication between the module interface and the module;
- detecting, by the display device, a prior association of the module with a second display device of the connected ecosystem;
- activating, by the display device, operation of the module, wherein the module is activated to provide functional output to the display device, wherein the module is a physical companion object that is configured to work with the display device for at least one of enhancing control and augmenting functionality of the display device; and
- updating, by the display device, a location of the module to the display device.

10. The method of claim 9, wherein the module is at least one of a display module, camera module, media storage module, graphical element module and speaker module.

11. The method of claim 9, wherein the pairing operation associates the module with the location of the display device relative to at least one additional device of a multi-screen ecosystem.

12. The method of claim 9, wherein activating operation of the module includes displaying at least one module output on the display device associated with a functional use of the module, the functional use is at least one of providing media, imaging, providing a display, outputting an application interface, and sound output.

13. The method of claim 9, further comprising enabling connectivity of the module with a second module associated with the module interface, wherein enabling connectivity of the module and second module provides interoperability of at least one function of the module and the second module for use with the display device.

14. The method of claim 13, further comprising enabling connectivity of the module with a second module to provide exchange of output between the module and second module to generate a combined functional capability for the display device.

15. The method of claim 9, wherein the display device is configured to provide a graphical interface element to indicate device activation and module connection.

16. The method of claim 9, further comprising applying a power supply to the module by way of the interface.

17. A system comprising:
- at least one module; and
- a first display device including a first interface, wherein the first interface includes a connected shelf integrated with the display device and configured to receive the at least one module, and wherein a control unit of the first display device is configured to
  - detect at least one module placed on the first interface;
  - initiate a pairing operation with the module, wherein the pairing operation is performed by wireless communication between the first interface and the module;
  - activate operation of the module, wherein the module is activated to provide functional output to the first display device; and
  - enable connectivity of the module with a second module associated with the first interface, wherein enabling connectivity of the module and second module provides interoperability of at least one function of the module and the second module for use with the first display device, wherein each module is a physical companion object that is configured to work with the display device for at least one of enhancing control and augmenting functionality of the display device.

18. The system of claim 17, wherein the module is at least one of a display module, camera module, media storage module, graphical element module and speaker module.

19. The system of claim 17, further comprising a second display device, wherein activating operation of the module includes detection of a prior association with a second display device of the connected ecosystem and updating location of the module to the display device.

20. The system of claim 17, further comprising applying a power supply to the module by way of the interface.

* * * * *